United States Patent
McNamara et al.

[15] 3,648,546
[45] Mar. 14, 1972

[54] TRANSMISSION HAVING LOW-INERTIA MAINSHAFT

[72] Inventors: Thomas V. McNamara, Kalamazoo; Edward L. Zahn, Galesburg, both of Mich.

[73] Assignee: Eaton Yale & Towne Inc., Cleveland, Ohio

[22] Filed: Sept. 30, 1970

[21] Appl. No.: 76,959

[52] U.S. Cl. ............................ 74/745, 74/339, 74/331, 74/333, 74/363
[51] Int. Cl. ..................... F16h 3/02, F16h 3/38, F16h 3/08
[58] Field of Search ............................ 74/745, 339

[56] References Cited

UNITED STATES PATENTS

| | | | |
|---|---|---|---|
| 1,744,576 | 1/1930 | Rhett | 74/339 X |
| 1,764,334 | 6/1930 | Murray | 74/339 |
| 2,637,221 | 5/1953 | Backus et al | 74/745 |
| 3,105,395 | 10/1963 | Perkins | 74/745 |
| 3,335,616 | 8/1967 | Perkins | 74/331 |
| 3,500,695 | 3/1970 | Keiser | 74/331 |

*Primary Examiner*—Arthur T. McKeon
*Attorney*—Woodhams, Blanchard & Flynn

[57] ABSTRACT

Shiftable gears arranged to minimize the need for synchronizers by utilizing, and/or avoiding, related environmental factors. In an environment where one ratio gear is always running faster than a second ratio gear, so that a shaft to which some are alternately connected must always be accelerated when said one gear is so connected and decelerated when the second gear is so connected, means are provided by which a nonrotating shift device, as a shift fork, is caused to apply a frictional drag to the shaft when the second gear is being connected and said shaft is isolated from such drag when the first gear is being connected. In a further and more specific aspect of the invention, ratio gears so connected are arranged between a main transmission and an auxiliary transmission and/or a split-shift device to extend the ratios available to the system but without adding to the synchronizers required for same.

13 Claims, 4 Drawing Figures

INVENTORS
THOMAS V. McNAMARA
EDWARD L. ZAHN
BY
Woodhams, Blanchard & Flynn
ATTORNEYS INVENTORS
THOMAS V. McNAMARA
EDWARD L. ZAHN
BY
Woodhams, Blanchard & Flynn
ATTORNEYS

TRANSMISSION HAVING LOW-INERTIA MAINSHAFT

FIELD OF THE INVENTION

This invention relates to gear shift mechanism and particularly to a type thereof utilizing supplemental ratio gears between the main transmission and auxiliary and/or split-shift devices wherein the shift means for such supplemental gears are so arranged that at least some of the synchronizers normally used therewith may be of minimal size or may be eliminated altogether.

BACKGROUND OF THE INVENTION

It has been know for many years in multiratio transmissions, particularly of the automotive type, to use either auxiliary transmissions or split-ratio devices in tandem with a main transmission for the purpose of multiplying the speed ratios available in a given transmission mechanism. One particularly successful commercial device of this nature is illustrated in U.S. Pat. No. 2,637,221, and a further development thereof is illustrated in U.S. Pat. No. 3,105,395. These particular devices, however, are only examples and many others are known to the trade and some thereof have been known for many years.

In at least a majority of these devices, particularly those involving a range shift in an auxiliary transmission as in the two patents above mentioned, there is present the necessity for using large synchronizers in order to accomplish the speed changes required of the parts during a shift of the auxiliary unit. This is because the shift must be made exceedingly quickly to be successful and manual control thereof, even by a countershaft brake or by increasing the speed of the driving engine requires too high a level of skill for the average vehicle operator. Thus, the success of the devices embodying the above-mentioned patents, as well as others of the same general type known to the market, have been derived in part from their success in bringing about a rapid shift but not requiring a higher level of operator skill than is normally available.

In spite of the success of the above-mentioned transmissions, efforts have continued to increase the number of speed ratios available while at the same time endeavoring to reduce the complexity and consequent expense of apparatus of this general type and efforts toward these somewhat inconsistent ends have gone in quite a number of specific directions. In experimental work leading to the present invention such efforts were directed toward introducing additional speed ratios between the main transmission and an auxiliary while minimizing the size and consequent weight and space requirements of the synchronizers used with such additional ratios or, preferably, the complete elimination of at least some thereof. Nevertheless, problems have continued to exist in providing such additional ratios between the main transmission and the auxiliary or split-ratio devices, whichever is used in a given case.

It is thus desirable to create a new concept in transmission organization which will minimize, or preferably eliminate, the need for synchronizers between at least some types of shiftable gears and particularly between supplemental gears introduced between the main transmission and an auxiliary and/or split-ratio device. It is further desirable to create such a concept which will utilize the normal speed change conditions existing in such apparatus for assisting proper synchronization of the gears to effect a rapid shift, which concept is to be applicable to a variety of gearing situations but where one gear is always running faster than a second gear particularly, for at least the immediate needs, to the gear ratios provided between a main transmission and an auxiliary connected and used in tandem therewith.

Accordingly, the objects of the invention, include:

1. To provide a change speed apparatus which can utilize the normal speed relationships between the shiftable parts for assisting the synchronization thereof.
2. To provide multiratio, change speed apparatus utilizing a main transmission and an auxiliary and/or split-ratio device in tandem with said main transmission, in which ratio gears located between the main transmission and the auxiliary and/or split-ratio device has only small, and preferably no, synchronizers associated therewith.
3. To provide an apparatus as aforesaid in which the auxiliary and/or split-ratio device is so related to the main transmission that it will have inherent speed relationships between the component parts thereof which can be utilized for synchronization purposes.
4. To provide an apparatus as aforesaid in which the parts required to change in speed as a result of a shift are of sufficiently low inertia that the required speed change can be made rapidly and with only small, or preferably no, synchronizers required.
5. To provide an apparatus as aforesaid which is sufficiently similar to presently known apparatus of the same general type that same can be manufactured without excessive changes from presently available engineering and presently known manufacturing, testing and operating techniques.
6. To provide an apparatus as aforesaid which will be reliable over long periods of operational life, which is of sufficient simplicity as will involve only minimum cost, either in the original manufacture or maintenance, and which yet will be highly effective for the purposes aforesaid.
7. To provide change speed apparatus particularly applicable to a situation where one gear is always running faster than another gear which will utilize the normal speed relationships between the shiftable parts for assisting the synchronization thereof and which is applicable to a number of locations within a transmission or other gearing system.

Other objects of the invention will be apparent to persons acquainted with apparatus of this general type upon reading the following disclosure and inspecting the accompanying drawings.

SUMMARY OF THE INVENTION

Figure 1:
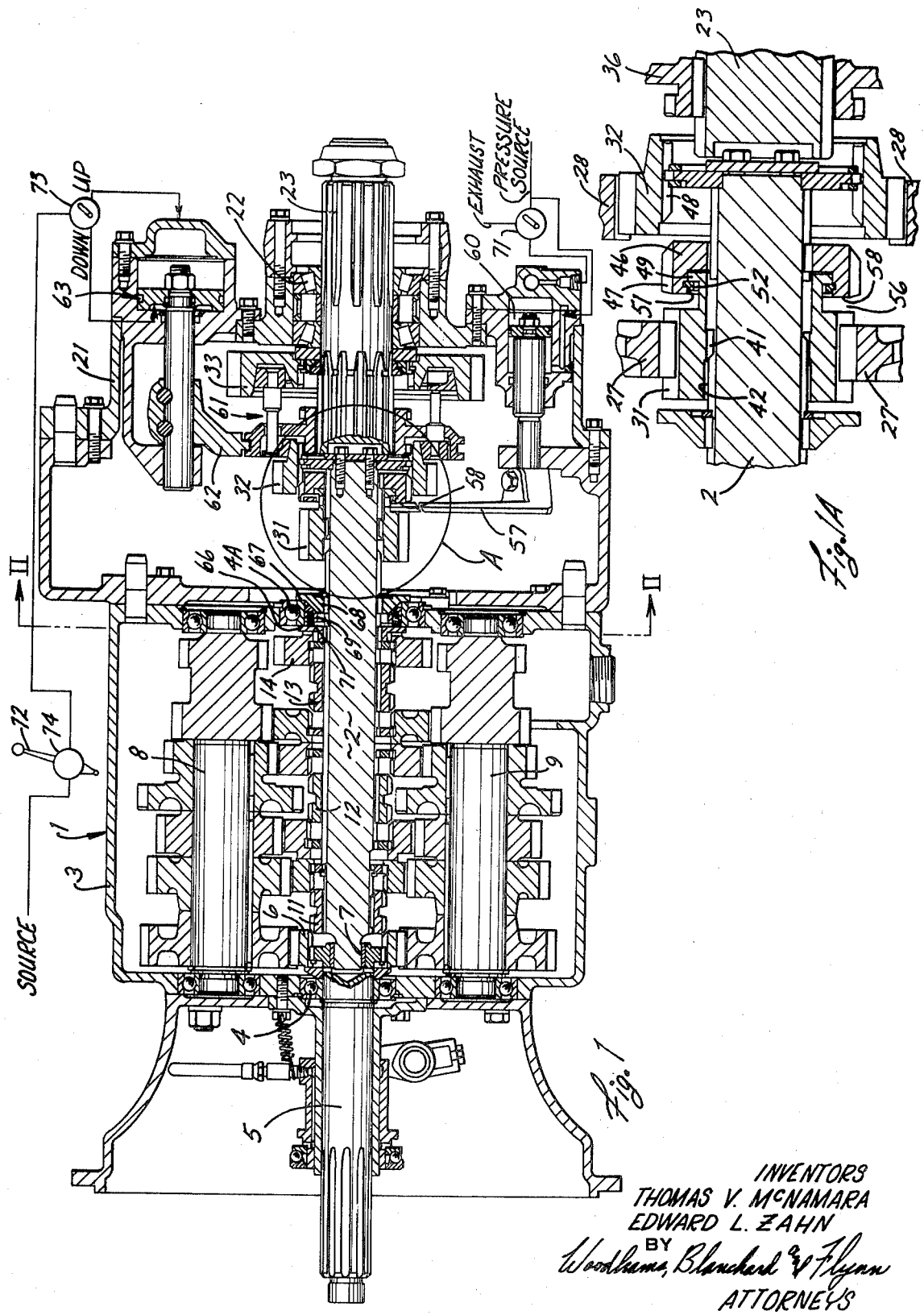
FIG. 1 is a sectional view of a twin countershaft transmission with an auxiliary unit in tandem therewith embodying the invention.

The drive gearing between the main transmission and the auxiliary unit includes a first gear arranged to rotate with the main shaft when connected therewith but slidably disconnectable therefrom and a second gear of greater diameter than the first gear arranged to rotate normally freely with respect to the main shaft but clutchable thereto. Both of these gears are in constant mesh with countershaft gears so that the first gear in all operating conditions of the transmission is always running faster than the second gear. These gears are arranged so that when the shift proceeds in one direction and it is necessary to slow the main shaft, both the gear into which a shift unit is being shifted and the drag of the shift fork combine to diminish the speed thereof but when the shift is proceeding in the opposite direction so that it becomes necessary to increase the speed of the main shaft, a driving connection is maintained to the driving wheels of the vehicle and the inertia thereof is utilized for increasing the speed of the main shaft. In this shifting direction the shift fork is caused to bear against the driven gear and not against any part rotatably connected to the shaft so that with the shift fork isolated from the shaft and gear against which the shift fork bears being driven by the vehicle inertia, the drag of the shift fork will have no undesirable effect on the rotative speed of the shaft.

DETAILED DESCRIPTION

Figure 3:
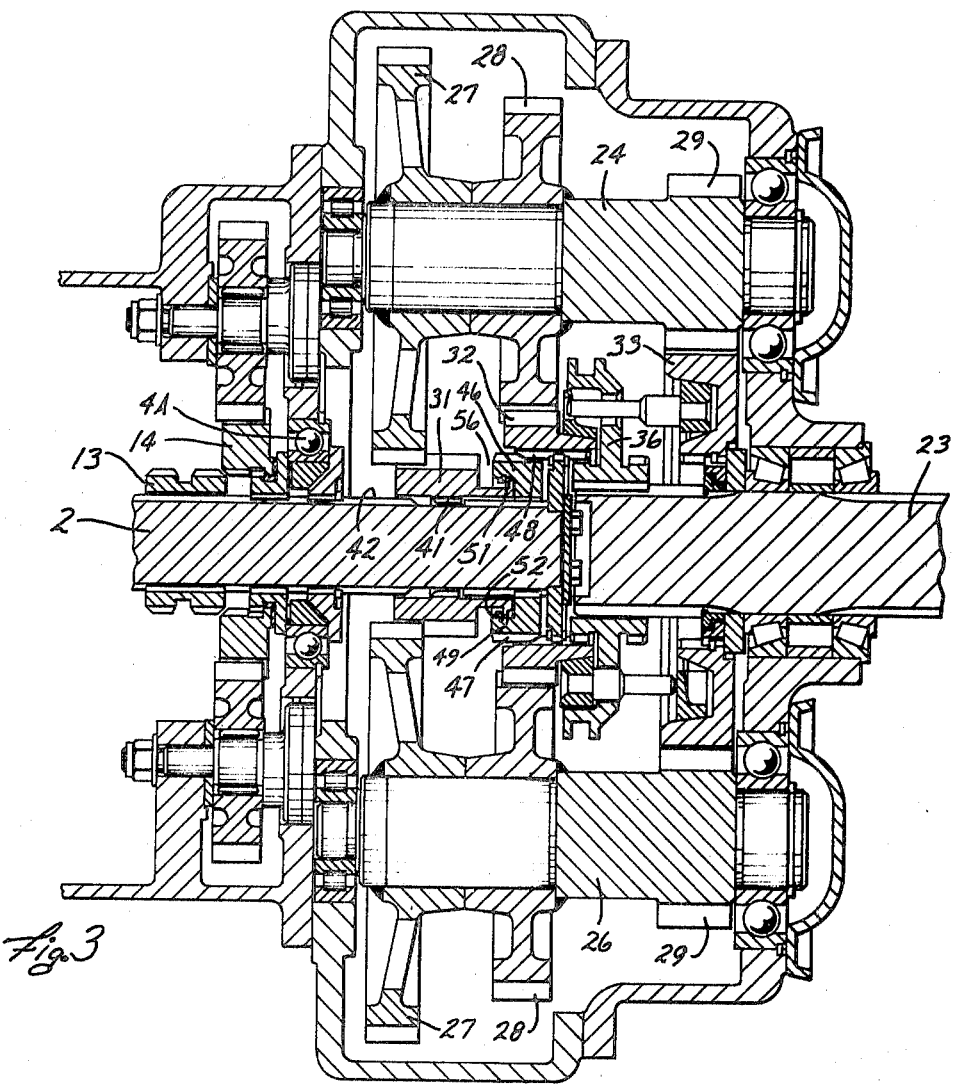
FIG. 3 is a further section of the auxiliary transmission shown in FIG. 1 taken on the line III—III of FIG. 2.
Figure 2:
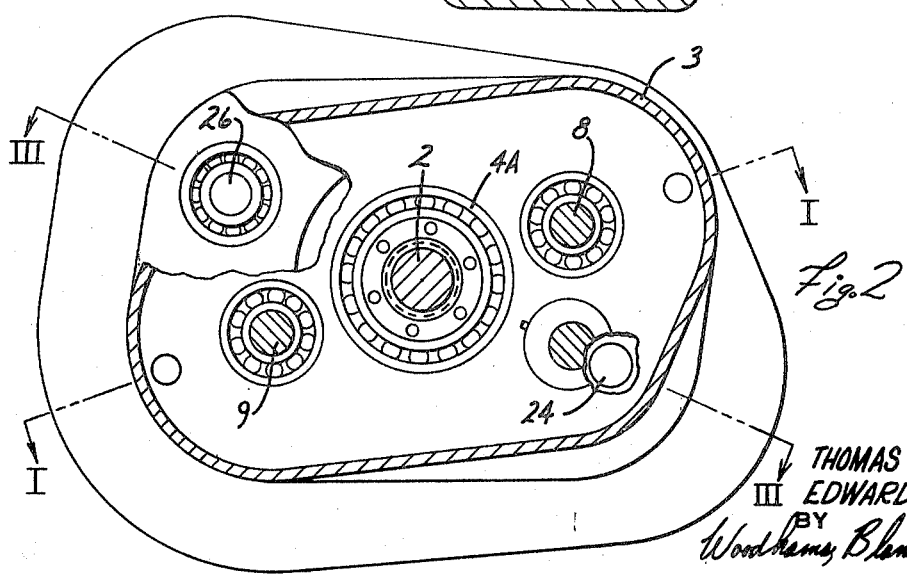
FIG. 2 is an end view taken on the line II—II of FIG. 1 and showing by line I—I the plane of the main transmission shown in FIG. 1.

Referring now to the drawings, there is indicated generally at 1 a main transmission which may be of any convenient, readily shiftable, type but preferably one whose main shaft 2 is rotatively connected to a main shaft gear only during a clutched condition therewith and is free to rotate independently of said main shaft gears during a neutral condition. While many types of transmissions are known which will meet these broad requirements, one particularly advantageous transmission is that shown in the patent to C. M. Perkins U.S. Pat. No. 3,335,616, which is, at least substantially, the transmission shown at 1 in the herein accompanying drawings and reference is made to such patent for a detailed description thereof. However, for convenient reference a brief description thereof follows:

The transmission casing 3 supports by suitable bearings 4 an input shaft 5 which in turn supports an input gear 6. The main shaft 2 is supported by a floatable bearing 4A in said casing 3 and by a pilot 7 in the input shaft 5. A pair of countershafts 8 and 9 are supported by suitable bearings in the casing 3 and each of them carry a plurality of countershaft gears each mounted for rotation with its respective shaft, two of said gears being in constant mesh with the input gear 6. A series of main shaft gears are in the manner shown in more detail in the above-mentioned patent arranged between, are rotatable with and are supported by, corresponding pairs of countershaft gears and are selectably clutchable to said main shaft 2 by convenient clutch devices which are here indicated at 11, 12 and 13. In connection with these clutching devices it will be noted that the leftward position of the clutching device 11 engages the input gear 6 for a direct connection of the input shaft 5 to the main shaft 2. It should be further noted that the gear 14 encircling the main shaft 2 is a reverse gear which is supported through further gears shown in FIG. 3 and driven by the radially aligned gears on said countershaft.

Suitable shift forks (not shown) are connected in a conventional manner to the sliders 11, 12 and 13 respectively and are themselves operated manually or by power means as desired.

Turning now to the auxiliary unit shown in association herewith, there is provided a further casing 21 affixed in any convenient manner at the rear of a casing 3 and supporting through bearing means 22 the auxiliary shaft 23. Said casing further supports auxiliary countershafts 24 and 26 each of which carries thereon, and for rotation therewith, the auxiliary countershaft gear pairs 27, 28 and 29.

A first auxiliary drive gear 31 is positioned between the auxiliary countershaft gears 27, is supported thereby and in constant mesh therewith. A second auxiliary drive gear 32 is supported on and for rotation with and in constant mesh with auxiliary countershaft gears 28. The auxiliary driven gear 33 is likewise supported on for rotation and in constant mesh with auxiliary countershaft gears 29. Said last-named gear is clutchable for rotation with the auxiliary shaft by slider 36 when in its rightward position. Suitable clutch teeth are provided between said slider 36 and the second auxiliary drive gear 32 for clutching of said latter to the auxiliary shaft 23 by said slider when same is in its leftward position. Said first auxiliary drive gear 31 is in clutchable relationship with the main shaft 2 by any convenient means by which such clutching can be effected through axial movement of said gear 31. In this embodiment, internal teeth 41 on said first auxiliary drive gear 31 are clutchable with external splining 42 formed on the main shaft 2. Thus, said first input auxiliary gear 31 through its support on and by the auxiliary countershaft gears 27 can be moved axially for clutching and declutching of the clutch teeth 41 and 42 without disturbing its driving relationship with the auxiliary countershaft gears.

Further suitable means are provided for effecting the above-mentioned axial movement of the first auxiliary drive gear 31 alternatively with clutching and declutching of the second auxiliary drive gear 32 with said main shaft 2. In this embodiment said means comprise a slider 46 which is arranged on said main shaft 2 for rotative movement therewith and sliding movement with respect thereto, in this case by splining. Said slider 46 has external clutch teeth 47 formed thereon which are mateable with internal clutch teeth 48 on the second auxiliary drive gear 32 in response to axial sliding movement of said slider 46.

Said gear 31, in this embodiment, has a radially extending flange 49 formed thereon and axially spaced from the clutch teeth thereof. Said flange enters into a recess 51 in the slider 46 and is held therein by any convenient means, such as a snap ring 52, to cause the gear 31 and the slider 46 to move axially together but to be rotatively independent. The spacing between the teeth of gear 31 and the clutch teeth 47 comprise a groove 56 for the reception of any convenient means for axially shifting of said slider 46, in this case a conventional clutch fork 57. Said clutch fork is axially movable by any convenient means which in this case comprises the conventional power mechanism shown generally at 60.

It will thus be seen that when said shift fork is moved rightwardly, as shown in FIG. 1, it bears against the portion of the slider upon which the clutch teeth 47 are formed to move both slider 46 and gear 31 rightwardly and when same is moved leftwardly it bears against the gear 31 and thereby moves both the gear 31 and the slider 46 leftwardly. Thus the gear 31 and the slider 46 form a unit which moves axially as a unit but in which the gear 31 and slider 46 are independently rotatable with respect to each other.

The mating faces of both sets of clutch teeth specifically clutch teeth 41 and 42, and clutch teeth 47 and 48, are preferably tapered as shown and as further illustrated and described in U.S. Pat. to Robert C. Russell No. 3,265,173. By this construction as set forth in detail in said patent said respective clutch teeth will have a substantial synchronizing effect on being brought into contact with each other and will have a long operational life without further synchronizing means and yet without excessive battering of the facing and interengaging surfaces.

Further synchronizing means of any conventional sort indicated generally at 61 may if desired be provided between the second auxiliary drive gear 32 and the auxiliary shaft 23 on the one hand and between the auxiliary gear 33 and the auxiliary shaft 23 on the other hand. Same will operate in a conventional manner upon sliding movement of the clutch slider 36. Sliding movement of same may be effected in any manner desired, such as through the shift arm 62 in response to shift cylinder 63. Both the shift arm 62 and the shift cylinder 63 are conventional and hence no further detailing thereof is needed.

In the embodiment illustrated, the bearing 4A is constructed so as to permit some radial movement of the shaft 2. Particularly, a flange 66 is fixed to the shaft ahead of the inner race of bearing 4A and a flange 67 is affixed to the shaft 2 rearwardly of said bearing race. Thus, axial movement of the shaft with respect to said bearing race is restrained. One of said flanges, here the rearward flange 67, is provided with a conical portion 68 projecting toward the other flange and the maximum diameter of said conical portion is slightly less than the inner diameter of said inner race. An annular pressure fitting 69 having an internal conical shape is provided snugly within said inner race and between said conical portion 68 and the flange 67 and has a series of axially oriented springs 71 bearing against the flange 66 to urge said fitting 69 toward the flange 67. Thus radial movement of the shaft 2 is absorbed by axial movement of the fitting 69 against its springs 71, thereby permitting some radial movement of said main shaft 2 with respect to the casing 1 in which the outer race of the bearing 4A is rigidly mounted but also constantly urging in response to the action of the springs 71 said shaft toward a centered position. This construction provides some floating capacity for the main shaft and particularly provides some floating capacity for the gear 31 and the slider 46 by which to improve their driving relationship with the countershaft gears 27 and 28. This in effect provides a floating input for the auxiliary unit which operates in generally the same manner and obtains generally the same advantages as set forth for a main transmission in U.S. Pat. No. 3,335,616, (FIG. 5 thereof).

OPERATION

Turning now to the operation of the apparatus above-described, the operation of the main transmission 1 is the same as set forth in the above-mentioned U.S. Pat. No. 3,335,616, and hence needs no description excepting to point out that whenever the transmission is in neutral, as appearing in FIG. 1, the main shaft 2 is free to rotate without connection to any of the main shaft gears and hence the inertia is sufficiently low that its speed can be easily adjusted upwardly or downwardly as needed. Thus with power applied from any convenient source to the input shaft 5 a progression can be made by appropriate movement of the sliders 11, 12 and 13 through the several speed ratios of which the transmission is capable. Since the details of operation are fully set forth in said U.S. Pat. No. 3,335,616, same need not be repeated here, and it is sufficient merely to point out that (1) when slider 13 is in its leftward position the transmission is in low gear ratio, (2) when slider 12 is in its rightward position, the transmission is in second gear ratio (3) when said slider 12 moves to its leftward position the transmission is in its third gear ratio, (4) when the slider 11 is in its rightward position, the transmission is in its fourth gear ratio and (5) when the slider 11 is in its leftward position, the transmission is in direct drive.

Turning now to the operation of the parts between the main shaft 2 and the auxiliary shaft 23, it will be appreciated that inasmuch as the auxiliary gears 27 are larger than the auxiliary gears 28 and since they are both rigidly fastened to their respective countershafts and will, therefore, all be rotating at the same angular speeds, the gears associated therewith, namely the first auxiliary drive gear 31 and the second auxiliary drive gear 32, will necessarily be rotating at different speeds with the gear 31 always rotating faster than the gear 32. Thus, when the slider 46 moves rightwardly to engage the gear 32, said main shaft and slider 46 must be decelerated and when the slider-46-gear-31 group returns leftwardly to cause gear 31 to reengage the main shaft 2, said main shaft must be accelerated.

Figure 1A:
FIG. 1A is an enlargement of the portion of FIG. 1 appearing within the circle A and showing the parts in a different shifted position.

With the slider 36 in its rightward position and the gear 31 leftwardly, as shown in FIG. 1A, the drive will be from main shaft 2 through gears 31 and 27 to the countershafts, then through gear 33 and slider 36 to the auxiliary shaft.

When the piston 60 is energized to move gear 31 and slider 46 rightwardly, it acts on the shift fork 57 to engage the slider 46 and urge it rightwardly and thereby engage the coupling comprising the clutch teeth 47 and 48. This causes the snapring 52 to bear against the flange 49 to move the gear 31 rightwardly and disengage it from main shaft 2 so that the drive connection is now from the main shaft 2 through the slider 46 to the gear 32 and thence to the countershaft gears 28, to the countershaft gears 29 and through the drive gear 33 to the auxiliary shaft 23. When said shift fork 57 moves the slider 46 rightwardly, it necessarily bears against the leftward face 58 thereof with a frictional engagement and tends to decelerate the rotation of said slider and the main shaft splined thereto. Since as above noted the gear 32 is rotating at a lesser rate of speed than the main shaft 2 and slider 46, this friction between the shift fork and the surface 58 decelerates the slider and main shaft and thereby assists the synchronizing of the clutch teeth 47 and 48 and thus assists same to complete its synchronizing and interengagement very quickly.

The final position of the auxiliary unit is then accomplished by energizing the cylinder 63 in any convenient manner and through it moving the slider 36 leftwardly. This acts through the synchronizers 61 if same are used, to effect a connection between the second auxiliary drive shaft 32 and the slider 36 to drive the auxiliary shaft 23 directly from said gear 32. This provides a direct drive from the main shaft 2 through the gear 32 to the auxiliary shaft 23.

In shifting in the reverse direction the cylinder 63 is first again actuated to move the slider 36 rightwardly to reengage the drive gear 33 to the auxiliary shaft 23, with the slider 46 remaining engaged to the gear 32. The next step is to actuate the cylinder 60 in a conventional manner to move the shift fork 57 leftwardly. This causes it to bear against the gear 31 to urge same leftwardly. Although frictional drag will exist between the shift fork 57 and the gear 31, it must be remembered that the inertia of the vehicle to which the transmission system is connected is now directly driving the gear 31 so that any slowing tendency because of the contact therewith of the shift fork 57 is negligible and may be ignored. The important thing is that the gear 31 is freely rotatable with respect to the slider 46 and hence whatever drag may be created between the shift fork 57 and the gear 31 is not applied to the slider 46 and hence not applied to the shaft 2. By so doing the dragging tendency of the shift fork is not transmitted to the shaft 2 and hence does not act to slow the rotation of the shaft 2. Instead the inertia driving by the load acts through the gear 31 and the cone faced splines 41 and 42 to accelerate the shaft 2 to a speed which will permit interengagement of the clutch teeth 41 and 42 to return the gear-31-slider-46 coupling to the position shown in FIG. 1A of the drawings.

Thus, the dragging tendency of the shift fork 57 is utilized where it tends to change the speed of the main shaft 2 in the desired direction but it is isolated therefrom when its dragging tendency would tend to change said main shaft speed oppositely to the desired direction.

While not involved in the illustrated embodiment, if the system is used as a splitter, one further possible arrangement will be to locate the gear-31-slider-46 coupling leftwardly and the slider 36 also leftwardly. In such case, the drive goes from the main shaft 2 through the splines 41 and 42 to the gear 31 then to the pair of auxiliary countershafts 24 and 26, through said auxiliary countershafts to the drive gear 32 and thence, through the slider 36 to the auxiliary shaft 23 for driving the load.

While several shift patterns are thus possible, the one used in the illustrated embodiment is as follows:

To start the vehicle in first gear the slider 13 in the main transmission is moved leftwardly to engage the low-ratio gear thereof, gear 31 is in its leftward position engaging the main shaft 2 and slider 36 is in its rightward position engaging gear 33. The power train then flows from the main transmission through gear 31 and gears 27 to the auxiliary countershafts and thence through gear 33 to the auxiliary output shaft 23. With gear 31 and slider 36 remaining in these positions, the main transmission may be shifted upwardly as desired. While with appropriate ratios it may be desirable, and is possible, to use all five ratios in the main transmission in this portion of the shift procedure, in the specific embodiment here illustrated only the first three ratios are used for this portion of the procedure, portion namely low ratio with sliders and 12 centered and slider 13 leftwardly, second ratio with sliders 11 and 13 centered and slider 12 rightwardly and third ratio with sliders 11 and 13 centered and slider 12 leftwardly.

When third gear is obtained, namely with sliders 11 and 13 centered and slider 12 leftwardly, the driver may select the intermediate range for the auxiliary by moving a suitable control 71. Upon such selection air is exhausted from the rightward side of the piston in the cylinder 60 so that a constant pressure applied to the leftward side thereof immediately and constantly urges said piston rightwardly to place a rightwardly directed force upon shift fork 57. Thereupon the shift lever 72 of the front transmission is moved manually to neutral position which disengages clutch 12 and upon the release of torque thereby the cylinder 60 disengages gear 31 from the shaft 2 and moves same rightwardly to engage the slider 46 with the gear 32. It will be appreciated, however, that while the foregoing shift mechanism is indicated for purposes of a full disclosure hereof, many shift apparatuses are known and can be chosen freely as desired for carrying out the shifting sequence here indicated.

At this point the engagement of the cone-formed teeth 47 and 48 tends to slow the slider 46 and with it the main shaft 2 and such slowing action is assisted by the frictional contact between the shift fork 57 and the leftward face 58 of the slider 46. Thus, the synchronization between the slider 46 and the gear 32, and resulting engagement of the teeth thereof, takes place very quickly.

With this portion of the shift completed the remainder of the upshift procedure is essentially that of the U.S. Pat. to Ludvigsen and Backus No. 2,637,211. However, for convenience, same will be briefly summarized hereinafter in connection with this particular transmission.

The operator first moves the clutch 13 again leftwardly to recommence a sequence through the main transmission with the low gear thereof. At this point the power flow from the main shaft 2 is to the slider 46, the gear 32, countershaft gears 28 to the countershafts and thence to the gear 33 and the auxiliary output shaft 23.

The operator then shifts through the several ratios of the main transmission by appropriate manual manipulation of the clutches 11, 12 and 13 as above outlined until direct drive is achieved in the main transmission. He now manipulates a preselector valve 73 to preselect a range shift in the same manner as set forth in said U.S. Pat. of Ludvigsen and Backus No. 2,637,221, and initiates the range shift through a shift lever valve 74 in the manner shown in said patent by moving the shift lever 72 for the main transmission to its neutral position. As set forth in more detail in said last-named patent, the sequence so initiated energizes cylinder 63, moves the slider 36 out of engagement with gear 33 and through its synchronizing function into engagement with the gear 32, thereby making a direct coupling from the main shaft 2 through the slider 46, the gear 32 and the slider 36 to the auxiliary main shaft 23. The driver then moves the clutch 13 again into first gear position as a first step in carrying out the high range sequence in the main transmission in the same manner and as set forth in said U.S. Pat. No. 2,637,221, and continues such sequence until he again achieves direct drive through the main transmission. The entire system is now in direct drive.

Return from high speed to low is accomplished by a reversal of the above-described procedures.

It will be recognized that although the foregoing description has assumed the presence of the auxiliary transmission 21 it is entirely possible that the gear 33 be eliminated and the gear 32 connected directly to the shaft 23 and only the countershaft gears 27 and 28 maintained for the purpose of providing a constant relationship between the speeds of the drive gear 31 and the drive gear 32. Thus, with the ratios of the gear pairs 31 and 27 and gear pair 32 and 28 properly chosen, same will function essentially as a split ratio output from the main transmission 1 to the output shaft 23 but with the same ease of shifting therebetween as already described.

Although a particular preferred embodiment of the invention has been disclosed in detail for illustrative purposes, it will be recognized that variations or modifications of the disclosed apparatus, including the rearrangement of parts, lie within the scope of the present invention.

Further, it will be appreciated that, although the specific shifting means is here shown as applied to supplemental ratio gears located between a main transmission and an auxiliary and/or split-ratio device, and such application constitutes one portion of the invention, such shifting means as such is also applicable anywhere that one ratio gear is always running faster than an adjacent ratio gear and hence will find use in a variety of additional environments.

The embodiments of the invention in which an exclusive property or privilege is claimed are defined as follows:

1. In a transmission having a first ratio gear which is under all operating circumstances running faster than a second ratio gear and a shaft requiring acceleration when the shift is toward said first gear and deceleration when said shift is toward said second gear, shift means therebetween comprising:
   axially movable, rotatable, slider means on said shaft and means constantly relating the rotation of said slider means to that of said shaft;
   first clutch means constantly rotatable with said first ratio gear, and means relating said first ratio gear and said slider means to comprise coupling means wherein said first ratio gear is axially movable with said slider means but independently rotatable with respect thereto, and said first ratio gear has one axial position in which said first clutch means is in rotative engagement with said shaft and a second axial position in rotative disengagement with said shaft;
   second clutch means constantly rotatable with said slider means, being in a first axial position of said slider rotatively disengaged with said second gear means and in a second axial position in rotative engagement therewith;
   shift means effecting axial movement of said coupling means and bearing against a portion rotative with said slider means for effecting movement of said slider means toward engagement with said second gear, and said shift means bearing against said first gear but not against said slider means for effecting movement of said slider means and said second clutch means out of engagement with said second gear and toward engagement of said first clutch means with said shaft;
   whereby the friction drag of said shift means against said coupling means will assist in deceleration of said shaft during engagement with said second gear but will not materially inhibit acceleration of said shaft during movement of said first gear into engagement with said shaft.

2. In a transmission having first and second ratio gears wherein said first ratio gear is always running faster than said second ratio gear and a shaft requiring acceleration when the shift is toward said first gear and deceleration when said shift is toward said second gear, said shaft carrying coupling means alternately connecting said shaft for rotation with one of said first and second gears, the combination comprising:
   first clutch means arranged between said first gear and said shaft;
   said coupling means including a slider movable axially with respect to said shaft and second clutch means arranged between said slider and said second gear;
   said first gear being arranged with respect to said slider for axial movement therewith but with rotative movement with respect thereto;
   a shift fork operable with said slider for bearing directly thereagainst upon movement thereof toward said second gear and bearing against said first gear for movement thereof toward clutching engagement with said shaft;
   whereby the drag of said shift fork will tend to decelerate said shaft during movement toward said second gear and will have substantially no effect upon the rotative speed of said shaft during movement of said slider toward said first gear.

3. The device of claim 2, wherein said first clutch means comprises first clutch teeth rotative with said shaft and said first gear includes second clutch teeth arranged for mating with said first clutch teeth.

4. The device of claim 2, wherein said second clutch means includes slider clutch teeth on said slider and second gear clutch teeth on said second gear for mating with said slider clutch teeth.

5. The device of claim 2, wherein said first clutch means includes first clutch teeth rotatable with said shaft and said first gear includes second clutch teeth internally thereof for mating with said first clutch teeth,
   and wherein said second clutch means includes clutch teeth formed externally on said slider and said second gear has internal clutch arranged for rotation therewith and mateable with said external clutch teeth, and wherein said first gear and said slider are so interconnected that said first gear is rotatable with respect to said slider but axially movable therewith.

6. The device of claim 5, wherein said shift fork is arranged for bearing against one end of said slider clutch teeth for urging said slider toward said second gear but bearing against said first gear and independent of said slider for urging said first gear into clutching engagement with said first clutch teeth.

7. In a transmission system including a main transmission having a main shaft and auxiliary, series connected, first and second ratio changing drive gears, the combination comprising:
   means rotatively supporting said auxiliary gears;
   a load connected countershaft including a pair of ratio gears in constant mesh with said first and second auxiliary gears whereby said first auxiliary gear is under all operating conditions running faster than said second auxiliary gear;
   slider means rotatable in relationship to the rotation of said shaft and related to said first auxiliary gear for axial movement therewith but for rotation independently thereof;
   first clutch means between said shaft and said first auxiliary gear and second clutch means between said slicer means and said second auxiliary gear;
   nonrotative shift means in frictional engagement with said slider means for urging movement thereof toward said second auxiliary gear and bearing against said first auxiliary gear but not against said slider means for urging movement of said first auxiliary gear in a direction to effect engagement of said first clutch means;
   whereby said shift means will tend to decelerate said shaft during movement toward said second gear and will have substantially no effect upon the rotative speed of said shaft during movement of said slider means toward said first gear.

8. The device of claim 7, wherein said auxiliary gears comprise a portion of a split ratio device arranged in series with said main transmission and wherein said first auxiliary gear is driven by the inertia from the load during the shifting operation toward engagement of said first clutch means.

9. The device of claim 7, wherein said auxiliary gears are a portion of an auxiliary transmission connected in series between said main transmission and a load,
   wherein said auxiliary transmission includes said auxiliary countershaft having said ratio gears in constant rotative relationship thereto and in constant mesh with said first and second auxiliary drive gears;
   whereby said first auxiliary gear will tend to be driven by the inertia of said load as same is moved toward a condition of engagement with said main shaft and the drag thereon by said shift means will not inhibit the necessary acceleration of said main shaft in order to accomplish the engagement of said first clutch means.

10. In a transmission system the combination comprising:
    a main transmission having an input shaft and a main shaft and ratio gears selectively engageable therebetween;
    an auxiliary transmission having an output shaft and at least one countershaft arranged adjacent thereto,
    first clutch teeth arranged for rotation with said main shaft,
    a slider arranged slidably with respect to said main shaft and rotatable therewith,
    a first gear including second clutch teeth mateable with said first clutch teeth and arranged with said slider for rotation with respect thereto and for axial movement therewith;
    a second gear rotatably supported and arranged for rotation with said auxiliary output shaft and having a clutchable relationship with said slider upon axial movement of said slider;
    a third gear arranged concentrically with said auxiliary output shaft and for selectable rotation therewith;
    first, second and third countershaft gears in constant rotative relationship with said countershaft and in constant mesh with said first, second and third gears respectively, the ratio of said gears being such that said first gear is under all transmission operating conditions rotating at a higher rotative speed than said second gear;
    operator controllable means for selectively connecting said second or third gears to said auxiliary output shaft for rotation therewith;
    nonrotative shift means bearable against said slider for urging same into clutchable engagement with said second gear and simultaneously imposing a frictional drag thereon tending to slow both said slider and said main shaft to assist in synchronizing same with said second gear and alternatively bearing against said first gear but not against said slider for urging said first gear into clutchable engagement with said main shaft and simultaneously substantially isolating the drag effect of said shift means from said slider so as to avoid a tendency to decelerate said main shaft when said shift means is urged in a direction to engage said first gear with said main shaft.

11. The device of claim 10, wherein said auxiliary transmission has at least two countershafts whereby at least said first gear is entirely supported on and by the countershaft gears with which it is in mesh and hence said slider is in operative engagement therewith for effecting axial movement of said first gear but is free from any supportive relationship with said first gear.

12. In a multiple countershaft transmission system the combination comprising:
    1. a main transmission having:
       a. a casing;
       b. an input shaft rotatable with respect to said casing and carrying an input gear rotatable therewith;
       c. a main shaft piloted in said input shaft rotatably with respect to said casing;
       d. a bearing rotatably and radially floatably supporting said main shaft at a point spaced from said input shaft for rotation with respect to, and limited radial movement with respect to, said casing while restraining said main shaft against axial movement with respect to said casing;
       e. multiple countershafts arranged rotatably within said casing and carrying matched pairs of countershaft gears fixed thereon;
       f. main shaft gears encircling said main shaft in constant mesh with and supported on and by said matched pairs of countershaft gears; and
       g. operator controllable clutch means for connecting a selected one of said main shaft gears to said main shaft; and
    2. an auxiliary transmission having:
       a. a casing;
       b. an auxiliary main shaft rotatably mounted with respect thereto, and multiple countershafts spaced from said auxiliary main shaft and rotatably mounted with respect to said casing,
       c. first and second match pairs of countershaft gears on said auxiliary countershafts;
       d. first and second auxiliary main shaft gears supported respectively on and by said pairs of said countershaft gears;
       e. a shift unit on said main shaft, said unit comprising said first auxiliary main shaft gear and a slider interconnected therewith for simultaneous axial movement along said main shaft, but for independent, with respect to each other, rotative movement, said slider being in constant sliding and rotative engagement with said main shaft of said main transmission and selectable engagement with said second auxiliary main shaft gear, and said first auxiliary main shaft gear selectable engageable with said main shaft and in constant engagement with the first of said pairs of auxiliary countershaft gears;
       f. operator controllable shift fork means interposed between said slider and said first auxiliary main shaft gear for moving said unit;

3. the radial moveability of said main shaft of said main transmission permitting centering of the engaged one of said first and second auxiliary main shaft gears with respect to the auxiliary countershaft gears associated therewith upon engagement of one of said first and second auxiliary main shaft gears with the main shaft of the main transmission.

13. The device of claim 12 including further selectable ratio gearing between the said auxiliary countershafts and the auxiliary main shaft.

* * * * *